April 1, 1952   M. J. GALLO ET AL   2,591,534
COMBINATION TRICYCLE AND BICYCLE
Original Filed Feb. 14, 1949   3 Sheets-Sheet 3
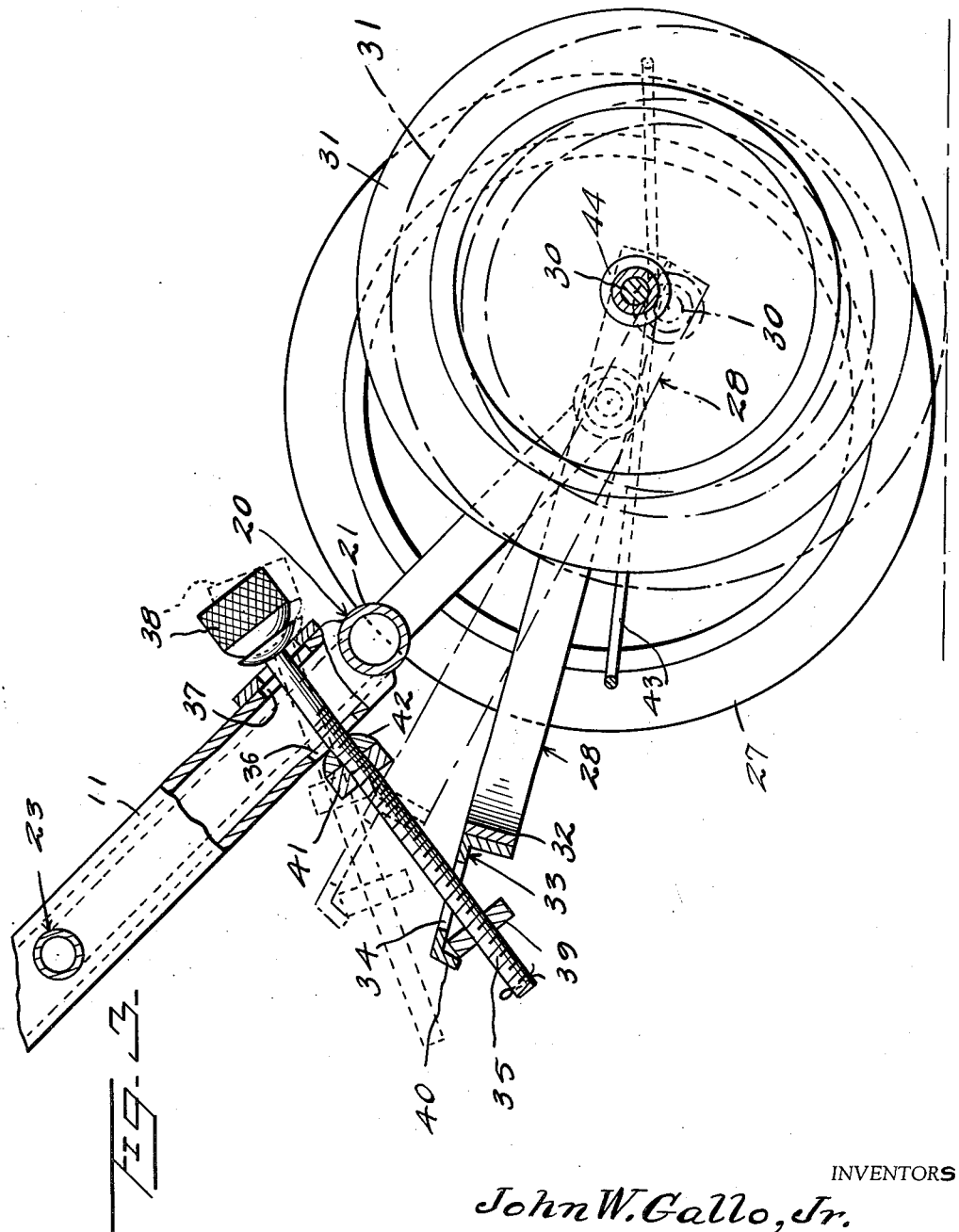
INVENTORS
John W. Gallo, Jr.
M. J. Gallo
BY Kimmel & Crowell
ATTORNEYS Patented Apr. 1, 1952

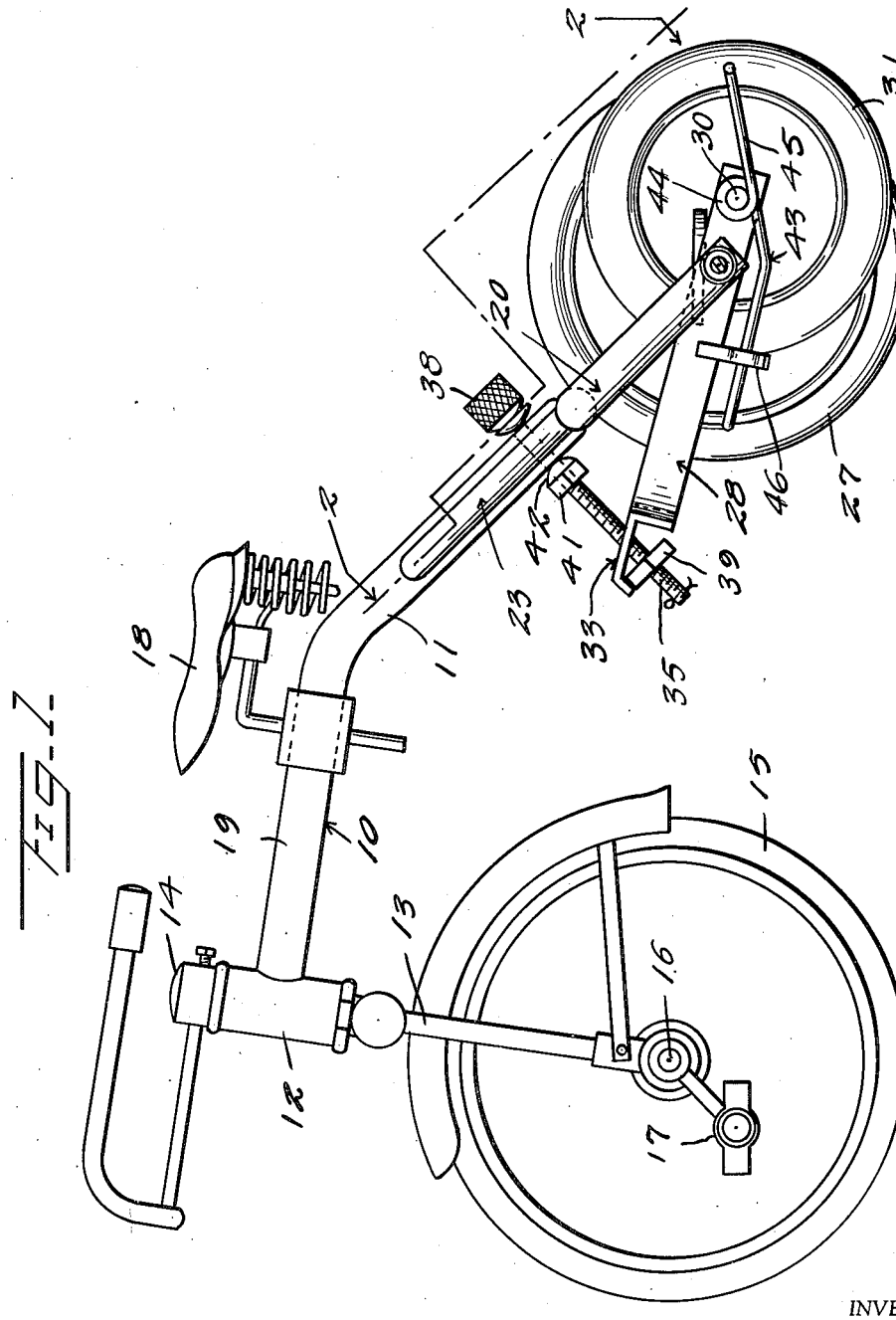

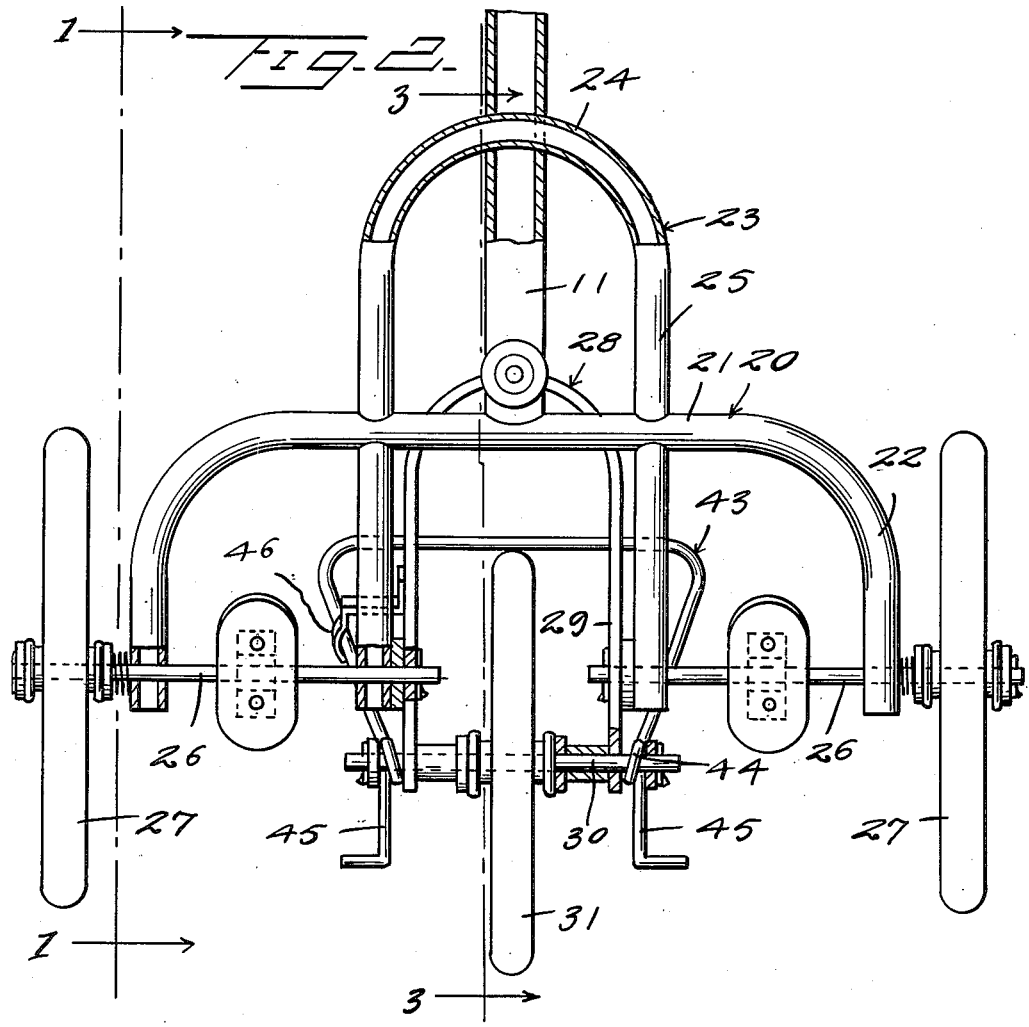

2,591,534

UNITED STATES PATENT OFFICE 2,591,534

COMBINATION TRICYCLE AND BICYCLE

Michael J. Gallo and John W. Gallo, Jr., West Medford, Mass., assignors of one-third to John Gallo, Sr., Boston, Mass.

Original application February 14, 1949, Serial No. 76,284. Divided and this application August 25, 1950, Serial No. 181,488

4 Claims. (Cl. 280—7.15)

This invention relates to a combination tricycle and bicycle and is a division of our copending application Serial No. 76,284, filed February 14, 1949, for Velocipede.

An object of this invention is to provide a combined tricycle and bicycle wherein the intermediate rear wheel which converts the tricycle into a bicycle can be positively locked in either operative or inoperative position.

Another object of this invention is to provide a combined tricycle and bicycle embodying a pair of rear wheels, a bicycle forming rear wheel disposed midway between the pair of rear wheels, a fork between which the rear bicycle wheel is rotatably mounted, and screw-threaded means for adjustably locking the fork with its wheel either extended or retracted.

With the above and other objects in view, my invention consists in the arrangement, combination and details of construction disclosed in the drawings and specification, and then more particularly pointed out in the appended claims.

In the drawings:

Figure 1 is a sectional view partly in side elevation of a combined tricycle and bicycle constructed according to an embodiment of this invention taken on the line 1—1 of Figure 2.

Figure 2 is a fragmentary sectional view taken on the line 2—2 of Figure 1.

Figure 3 is a fragmentary sectional view taken substantially on the line 3—3 of Figure 2.

Referring to the drawings, the numeral 10 designates generally a frame structure embodying a longitudinally bent tubular member 11 which has secured to the forward end thereof a bearing housing 12 through which a front fork 13 is adapted to rotatably engage. A handle bar 14 is secured to the upper end of the fork 13, and a front steerable wheel 15 is rotatably disposed between the arms of the fork 13 being secured to a crank shaft 16 having pedals 17 secured to the offset ends thereof. A seat 18 is secured to the forward portion 19 of the bent bar 11, and the bar 11 has fixed to the rear and lower end thereof an inverted U-shaped bar generally designated as 20. The bar 20 includes a bight member 21 and a pair of downwardly directed arms 22. A second U-shaped tubular member 23 of inverted construction has the bight 24 thereof extending through and fixed in the rear portion of the longitudinal bar 11 and has the parallel legs 25 thereof fixed through the bight 21 of the inverted U-shaped member 20. A shaft 26 extends through the lower rear end of a leg or side 25 of the U-member 23 and also projects through an arm 22 of the U-member 20, and a wheel 27 is rotatably mounted on the projecting outer end of the shaft 26. There are two of these shafts 26 disposed in axial alignment with their inner ends spaced apart as shown in Figure 2. A U-shaped fork generally designated as 28 is rockably mounted on the inner ends of the two shafts 26, the shafts 26 projecting through the parallel arms 29 of the U-member 28.

A shaft 30 is extended through the rear ends of the arms 29 which project rearwardly of the shafts 26 and a wheel 31, which is an intermediate and bicycle forming wheel, is rotatably mounted on the shaft 30. The fork 28 includes a bight member 32 which has projecting from the center thereof a bar 33. The bar 33 is formed with a slot 34 through which loosely extends an adjusting bolt 35, and bolt 35 also extends through slots 36 and 37 formed in the rear of frame bar 11. Bolt 35 has a knurled head 38 on its upper end, and a fork adjusting nut 39 engages beneath bar 33 and is held against rotation by a lug 40 carried by bar 33. A lock nut 41 is threaded on bolt 35 with a cup-shaped washer 42 interposed between nut 41 and the lower side of bar 11.

A substantially U-shaped stand 43 which is formed of a relatively rigid round bar is rockably mounted on the shaft 30 being formed with a pair of eyes 44 and rearwardly projecting L-shaped stop members 45. A resilient clip 46 is carried by the fork 28 and is adapted to releasably hold the stand 43 in inoperative position.

In the use and operation of this device, when it is desired to use the device as a tricycle, the intermediate wheel 31 is disposed in the full line position shown in Figures 1 and 3. In this position the fork 28 is lowered at its forward end. When it is desired to use the intermediate wheel 31 so as to thereby convert the tricycle into a bicycle, the fork 28 is raised upwardly to the dot and dash line position shown in Figure 3. The fork 28 is raised at its forward end by turning the adjusting bolt 35 to thread nut 39 onto bolt 35. At the time bolt 35 is turned to thread nut upwardly thereon, lock nut 41 is loosened slightly to permit turning of bolt 35. When the forward end of fork 28 is raised to extend wheel 31 below wheels 27, lock nut 41 is again tightened to lock bolt 35 against turning.

With a device as hereinbefore described, the intermediate wheel 31 is positively locked in either an operative or inoperative position.

What is claimed is:

1. A velocipede comprising a frame structure formed of a tubular longitudinal frame bar, a steerable wheel at the front of said bar, an outer U-shaped member fixed to the rear of said bar, an inner U-shaped member fixed to said bar and to said outer member, a pair of aligned axles carried by said members, a pair of outer wheels journalled on the outer ends of said axles, an intermediate wheel, a fork for said intermediate wheel rockably mounted on the inner ends of said axles, an axle for said intermediate wheel extending through the arms of said fork, and means for angularly adjusting said fork whereby said intermediate wheel may be extended below said outer wheels.

2. A velocipede comprising a frame structure formed of a tubular longitudinal frame bar, a steerable wheel at the front of said bar, an outer U-shaped member fixed to the rear of said bar, an inner U-shaped member fixed to said bar and to said outer member, a pair of aligned axles carried by said members, a pair of outer wheels journalled on the outer ends of said axles, an intermediate wheel, a fork for said intermediate wheel rockably mounted on the inner ends of said axles, an axle for said intermediate wheel extending through the arms of said fork, means for angularly adjusting said fork whereby said intermediate wheel may be extended below said outer wheels, and a stand comprised of a U-shaped member having loops in the legs thereof secured to the ends of said last-mentioned axle for supporting said velocipede when stationary.

3. A velocipede comprising a frame structure formed of a tubular longitudinal frame bar, a steerable wheel at the front of said bar, an outer U-shaped member fixed to the rear of said bar, an inner U-shaped member fixed to said bar and to said outer member, a pair of aligned axles carried by said members, a pair of outer wheels journalled on the outer ends of said axles, an intermediate wheel, a fork for said intermediate wheel rockably mounted on the inner ends of said axles, an axle for said intermediate wheel extending through the arms of said fork, and means for angularly adjusting said fork whereby said intermediate wheel may be extended below said outer wheels, said last mentioned means including an adusting bolt extended through a slot in said fork.

4. A velocipede comprising a frame structure formed of a tubular longitudinal frame bar having an aperture therethrough, a steerable wheel at the front of said bar, an outer U-shaped member fixed to the rear of said bar, an inner U-shaped member fixed to said bar and to said outer member, a pair of aligned axles carried by said members, a pair of outer wheels journalled on the outer ends of said axles, an intermediate wheel, a fork for said intermediate wheel rockably mounted on the inner ends of said axles, a bar on said fork having a slot therethrough, an axle for said intermediate wheel extending through the arms of said fork, and means for angularly adjusting said fork whereby said intermediate wheel may be extended below said outer wheels, said last mentioned means including an adjusting bolt extended through said aperture and slot and an adjusting nut on said bolt beneath said bar.

MICHAEL J. GALLO.
JOHN W. GALLO, Jr.

REFERENCES CITED

The following references are of record in the file of this patent:

UNITED STATES PATENTS

| Number | Name | Date |
|---|---|---|
| 1,309,493 | Tyler | July 8, 1919 |
| 2,011,402 | Gallo | Aug. 13, 1935 |
| 2,220,528 | Kutil | Nov. 5, 1940 |